United States Patent
Goriki et al.

(10) Patent No.: US 8,040,074 B2
(45) Date of Patent: Oct. 18, 2011

(54) DISCHARGE-LAMP LIGHTING DEVICE AND LUMINAIRE

(75) Inventors: Takeshi Goriki, Yawata (JP); Akira Yufuku, Hirakata (JP); Jun Konishi, Himeji (JP)

(73) Assignees: Panasonic Electric Works Co., Ltd., Osaka (JP); Ikeda Electric Co., Ltd., Hyogo (JP)

( * ) Notice: Subject to any disclaimer, the term of this patent is extended or adjusted under 35 U.S.C. 154(b) by 419 days.

(21) Appl. No.: 12/301,540

(22) PCT Filed: May 24, 2007

(86) PCT No.: PCT/JP2007/060585
§ 371 (c)(1),
(2), (4) Date: Nov. 19, 2008

(87) PCT Pub. No.: WO2007/138969
PCT Pub. Date: Dec. 6, 2007

(65) Prior Publication Data
US 2009/0146579 A1    Jun. 11, 2009

(30) Foreign Application Priority Data
May 26, 2006    (JP) ................................ P2006-146102

(51) Int. Cl.
*H05B 41/26*    (2006.01)

(52) U.S. Cl. ..................... 315/287; 315/209 R; 315/224; 315/291; 315/307

(58) Field of Classification Search ............. 315/209 R, 315/224, 246, 247, 291, 307, 311
See application file for complete search history.

(56) References Cited

U.S. PATENT DOCUMENTS

| | | | |
|---|---|---|---|
| 6,437,515 B1 * | 8/2002 | Kamoi et al. ............. | 315/209 R |
| 6,963,176 B2 * | 11/2005 | Onishi et al. ................. | 315/291 |
| 7,692,391 B2 * | 4/2010 | Nakada et al. ................ | 315/291 |

(Continued)

FOREIGN PATENT DOCUMENTS
JP    04-61792    2/1992
(Continued)

OTHER PUBLICATIONS
English language Abstract of JP 4-61792, Feb. 27, 1992.
(Continued)

*Primary Examiner* — Douglas W Owens
*Assistant Examiner* — Thai Pham
(74) *Attorney, Agent, or Firm* — Greenblum & Bernstein, P.L.C.

(57) ABSTRACT

There is provided a discharge-lamp lighting device that, upon start-up of a high-intensity discharge lamp, alternately outputs a period A during which a starting circuit applies a high voltage to the high-intensity discharge lamp by resonance operation when a DC/AC inverter outputs a high-frequency voltage, and a period B during which the DC/AC inverter applies a low-frequency-square-wave voltage or a DC voltage to the high-intensity discharge lamp via the starting circuit. The period A for applying the high voltage by the resonance operation is set to about a time enough for a high-intensity discharge lamp in an initial aging stage to cause a dielectric breakdown, and a period C for alternately outputting the high-voltage generating period A and the period B for outputting the low-frequency-square-wave voltage or the DC voltage is set to about a time enough for a high-intensity discharge lamp in a life's last stage to cause a dielectric breakdown.

16 Claims, 12 Drawing Sheets

U.S. PATENT DOCUMENTS

| | | | |
|---|---|---|---|
| 2005/0264237 A1* | 12/2005 | Ishizuka | 315/209 R |
| 2006/0049777 A1* | 3/2006 | Kumagai et al. | 315/224 |
| 2007/0063659 A1* | 3/2007 | YAamashita et al. | 315/360 |
| 2007/0210727 A1 | 9/2007 | Sun et al. | |
| 2008/0030143 A1 | 2/2008 | Goriki et al. | |
| 2008/0048586 A1 | 2/2008 | Hasegawa et al. | |
| 2008/0143270 A1 | 6/2008 | Sun et al. | |
| 2008/0157693 A1 | 7/2008 | Yamamoto et al. | |

FOREIGN PATENT DOCUMENTS

| | | |
|---|---|---|
| JP | 4-61792 | 2/1992 |
| JP | 5-266984 | 10/1993 |
| JP | 7-240293 | 9/1995 |
| JP | 9-97690 | 4/1997 |
| JP | 2002-75677 | 3/2002 |
| JP | 2002-075677 | 3/2002 |
| JP | 2004-265707 | 9/2004 |
| JP | 2005-38814 | 2/2005 |

OTHER PUBLICATIONS

English language Abstract of JP 2002-75677, Mar. 15, 2002.
English language Abstract of JP 7-240293, Sep. 12, 1995.
English language Abstract of JP 2005-38814, Feb. 10, 2005.
English language Abstract of JP 9-97690, Apr. 8, 1997.
English language Abstract of JP 5-266984, Oct. 15, 1993.
English language Abstract of JP 2004-265707, Sep. 24, 2004.
Japanese Office Action, mailed Oct. 19, 2010.

* cited by examiner

FIG. 5
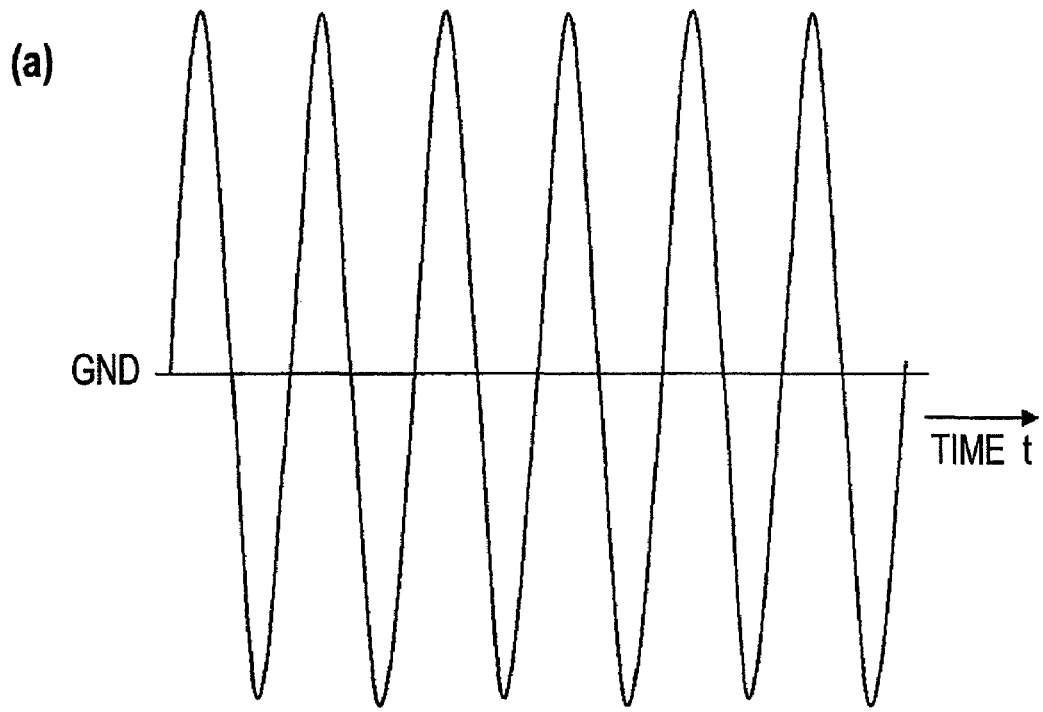
(a) HIGH-VOLTAGE PULSE WAVEFORM
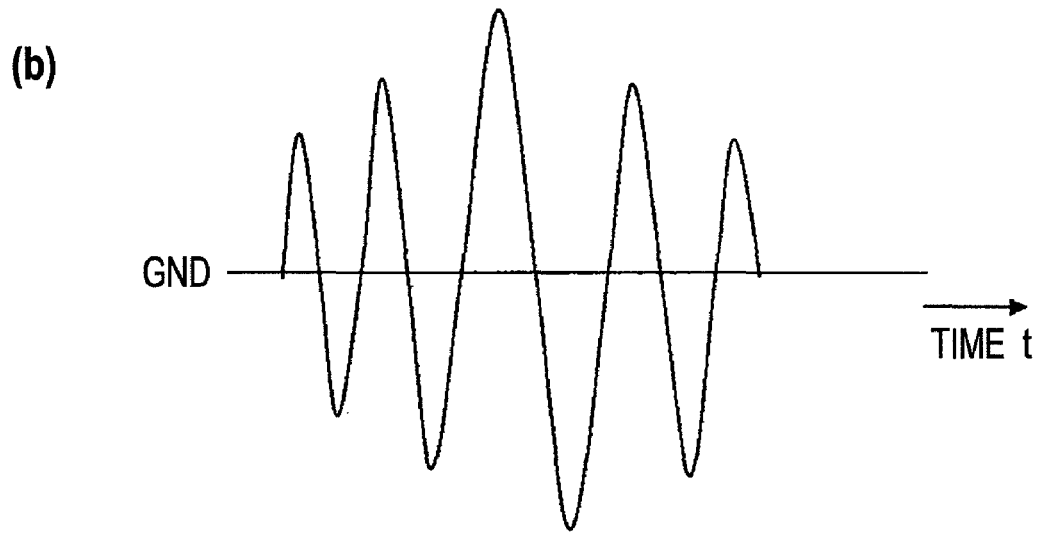
(b) HIGH-VOLTAGE PULSE WAVEFORM FIG. 6
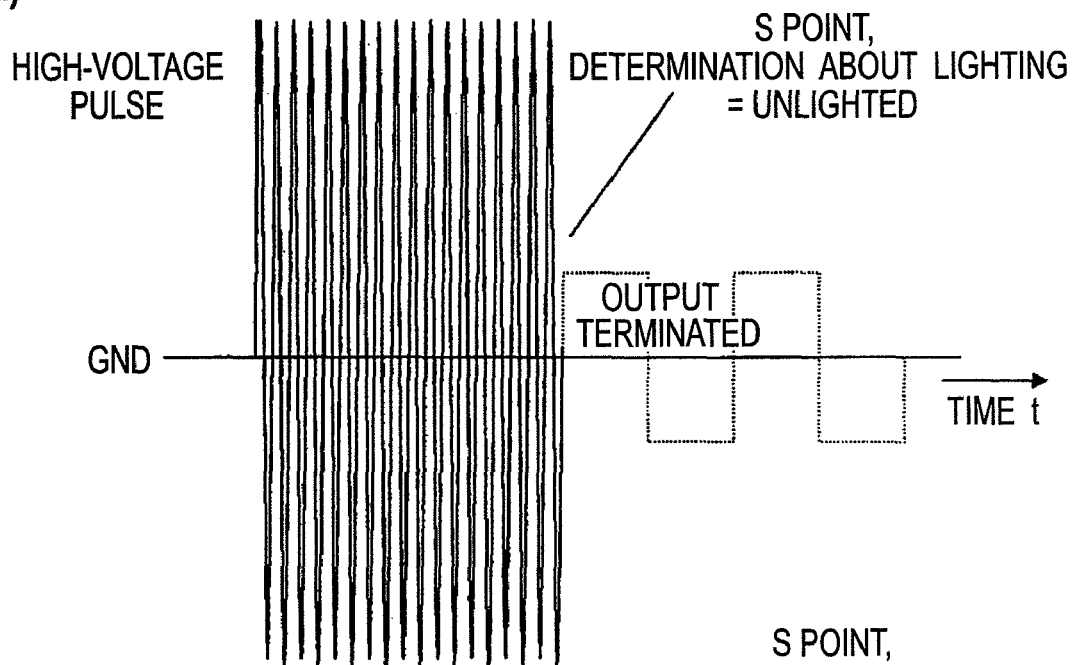
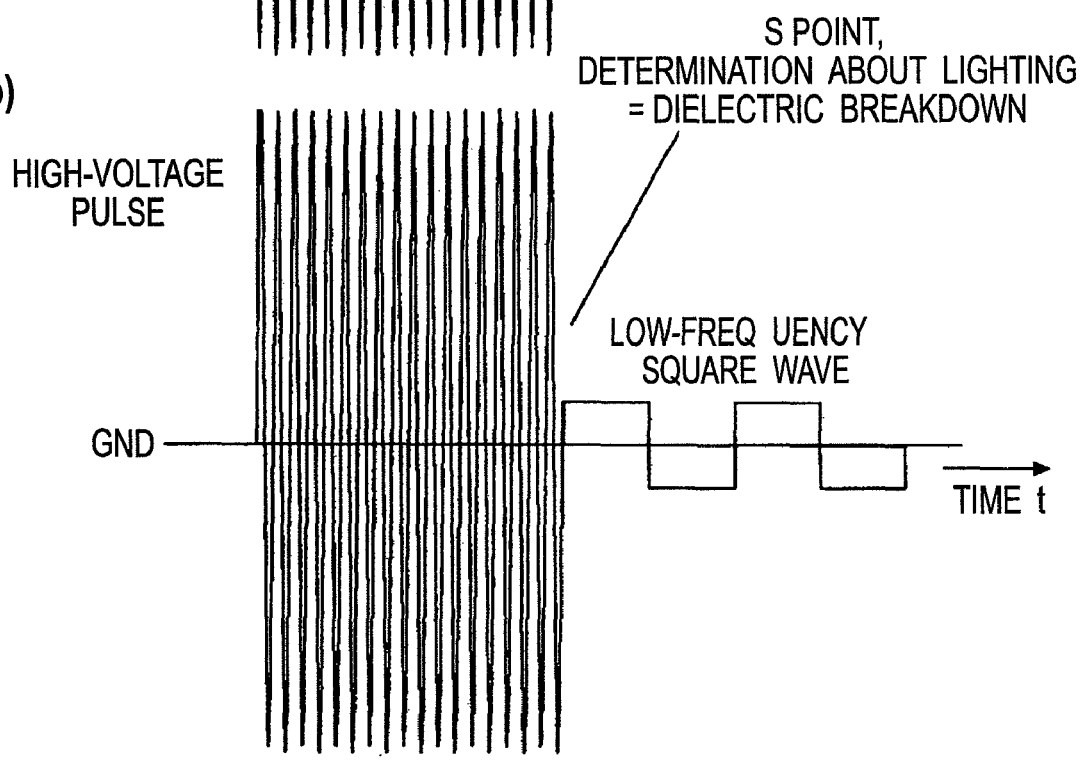

DISCHARGE-LAMP LIGHTING DEVICE AND LUMINAIRE

TECHNICAL FIELD

The present invention relates to a discharge-lamp lighting device for lighting a high-intensity discharge lamp and a luminaire using the same.

BACKGROUND ART

A high-intensity discharge lamp is of compact size, offers a high luminous flux, and is analogous to a point source of light, and also light distribution is easy to control. Therefore, it has been widely used as an alternative to an incandescent lamp or a halogen lamp in recent years. For lighting this high-intensity discharge lamp, there is a discharge-lamp lighting device that switches DC voltage on and off at high frequency and converts it into a low-frequency square wave via an inductor and a capacitor thereby to operate the high-intensity discharge lamp. When high-frequency electric power is used to light the high-intensity discharge lamp, arc discharge becomes unstable due to acoustic resonance, and therefore the lamp flickers or goes out. In contrast, AC-powered lighting by the low-frequency square wave ensures stable arc discharge continuously.

Upon start-up of the high-intensity discharge lamp, it requires a dielectric breakdown caused by an application of impulse voltage of several to tens of kV. Further, following the occurrence of the dielectric breakdown between electrodes, a transition from glow discharge to arc discharge is required. Thus, energy needs to be supplied in optimum conditions depending on each operating state, and also control needs to be made to achieve a smooth transition from a start-up state to a stable lighting state.

Japanese Patent Application Laid-Open No. 2004-265707 has proposed that, upon start-up time of the high-intensity discharge lamp, a period A during which high voltage is applied by resonance operation and a period B during which low-frequency-square-wave voltage is applied, are alternately repeated during a period C, as shown in FIG. 7. The dielectric breakdown between electrodes is ensured by the period A for applying the high voltage by the resonance operation, and the transition from the glow discharge to the arc discharge is ensured by the period B for applying the low-frequency-square-wave voltage.

Recent studies have found that it is important to set the periods A, B, and C in FIG. 7 to their respective optimum lengths. Specifically, a problem has been found that, when the period A for applying the high voltage by the resonance operation is too short relative to the period B for applying the low-frequency-square-wave voltage, the transition from the glow discharge to the arc discharge can be made smoothly, but dielectric breakdown performance is deficient. In contrast, the period A for applying the high voltage by the resonance operation is too long relative to the period B for applying the low-frequency-square-wave voltage, the dielectric breakdown is possible, but the transition from the glow discharge to the arc discharge is not made smoothly.

The present invention has been made in consideration of the foregoing problem, and an object thereof is to provide a discharge-lamp lighting device and a luminaire that provide optimum dielectric breakdown performance and arc transition performance, which are two major factors in starting a high-intensity discharge lamp, by determining and defining optimum conditions from qualitative and quantitative points of view for a period during which high voltage is applied by resonance operation, a period during which low-frequency-square-wave voltage or DC voltage is applied, and a cycle of these repetitive periods, thereby to realize smooth start-up of the high-intensity discharge lamp.

DISCLOSURE OF INVENTION

According to the present invention, in order to achieve the foregoing object, there is provided a discharge-lamp lighting device including, as shown in FIG. 1, a DC/DC converter 4 that converts a power supply voltage of a DC power supply (smoothing capacitor 3) and stably lights a high-intensity discharge lamp 7, a DC/AC inverter 5 that converts the DC voltage into an AC voltage, and a starting circuit 6 that has a resonance circuit composed of at least one or more capacitors 66 and inductors 65 as shown in FIG. 4 and supplies an output from the DC/AC inverter 5 to the high-intensity discharge lamp 7. Upon start-up of the high-intensity discharge lamp 7, a period A during which the starting circuit 6 applies a high voltage generated by resonance operation of the resonance circuit to the high-intensity discharge lamp 7 when the DC/AC inverter 5 outputs a high-frequency voltage, and a period B during which the DC/AC inverter 5 applies a low-frequency-square-wave voltage or a DC voltage to the high-intensity discharge lamp 7 via the starting circuit, are output in an alternate manner as shown in FIG. 7. While the high-intensity discharge lamp 7 is lighted, the DC/AC inverter 5 applies the low-frequency-square-wave voltage to the high-intensity discharge lamp 7 via the starting circuit. The period A for applying the high voltage by the resonance operation is set to about a time enough for a high-intensity discharge lamp in an initial aging stage to cause a dielectric breakdown, and a period C for outputting the high-voltage generating period and the low-frequency-square-wave voltage or DC voltage generating period in the alternate manner is set to about a time enough for a high-intensity discharge lamp in a life's last stage to cause the dielectric breakdown.

BRIEF DESCRIPTION OF THE DRAWINGS

FIG. 5 shows operational waveforms of the starting circuit in FIG. 4.

FIG. 6 also shows operational waveforms of the starting circuit in FIG. 4.

BEST MODE FOR CARRYING OUT THE INVENTION

First Embodiment

Figure 1:
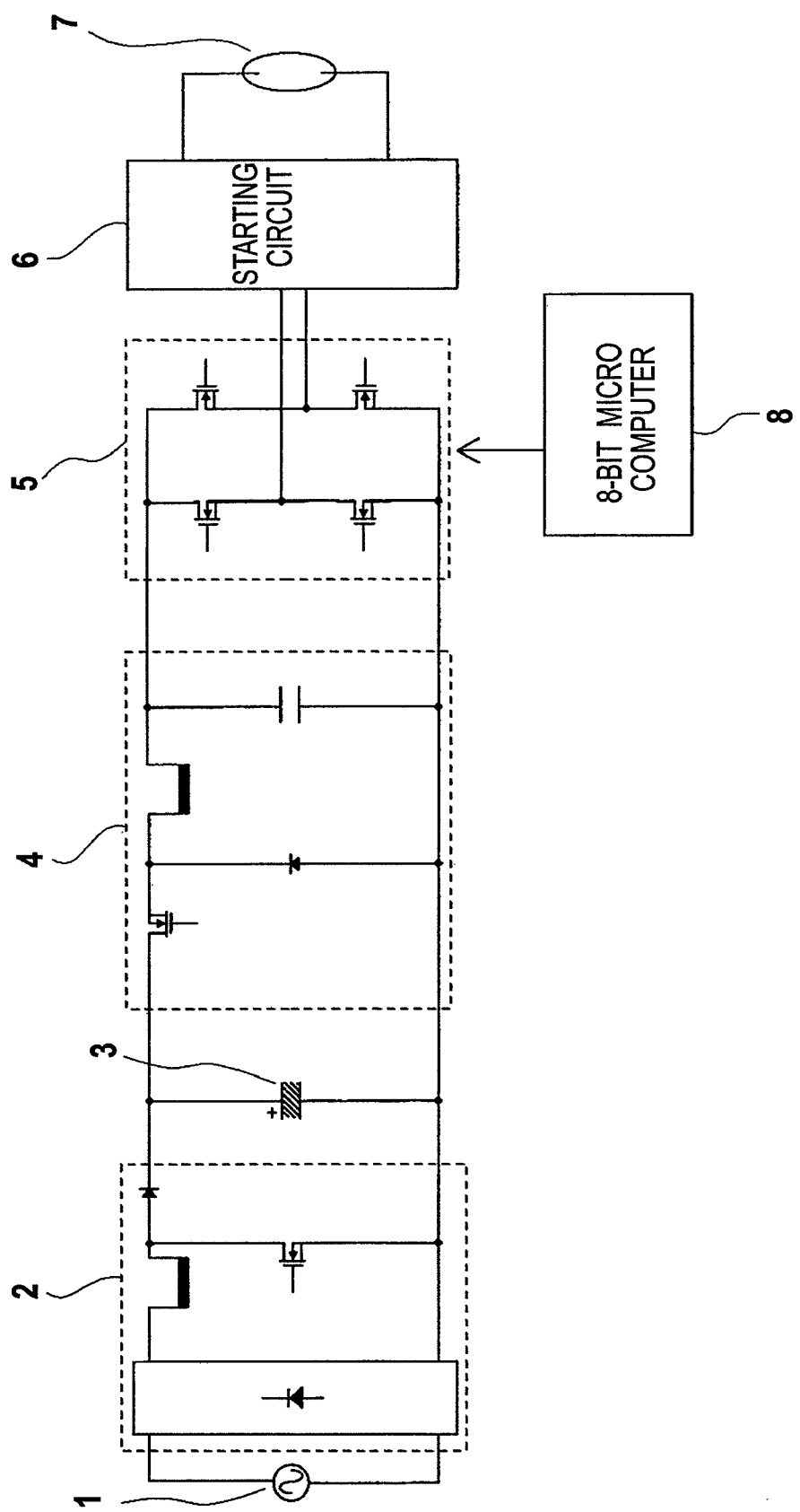
FIG. 1 is a circuit diagram according to a first embodiment of the present invention.

FIG. 1 shows a circuit structure of a discharge-lamp lighting device according to a first embodiment of the present invention. A voltage output obtained from an AC power supply 1, which supplies commercial power supply voltage, and then rectified by a rectifier 2, is smoothed by a capacitor 3, and a DC/DC converter 4 controls a lamp current or lamp power necessary for stably lighting a high-intensity discharge lamp 7. The output controlled to a desired value is converted into a low-frequency square wave output by the DC/AC inverter 5, and then supplied to the high-intensity discharge lamp 7. Upon start-up of the high-intensity discharge lamp 7, it requires a dielectric breakdown induced by a high impulse voltage of several to tens of kV. A high-voltage pulse is generated from a starting circuit 6 to start the high-intensity discharge lamp 7.

A start-up process of the high-intensity discharge lamp is characterized by a dielectric breakdown between electrodes and its subsequent transition from glow discharge to arc discharge, and control needs to be made so that energy is supplied in optimum conditions depending on each operating state in order to achieve a smooth transition from a start-up state to a stable lighting state. Therefore, the high-intensity discharge lamp is different from a fluorescent lamp in that the fluorescent lamp can start with a dielectric breakdown requiring a relatively low voltage of hundreds of V and also quickly shifts to a steady discharging state. Accordingly, control made in the start-up process of the high-intensity discharge lamp is more complex than that of the fluorescent lamp.

Figure 2:
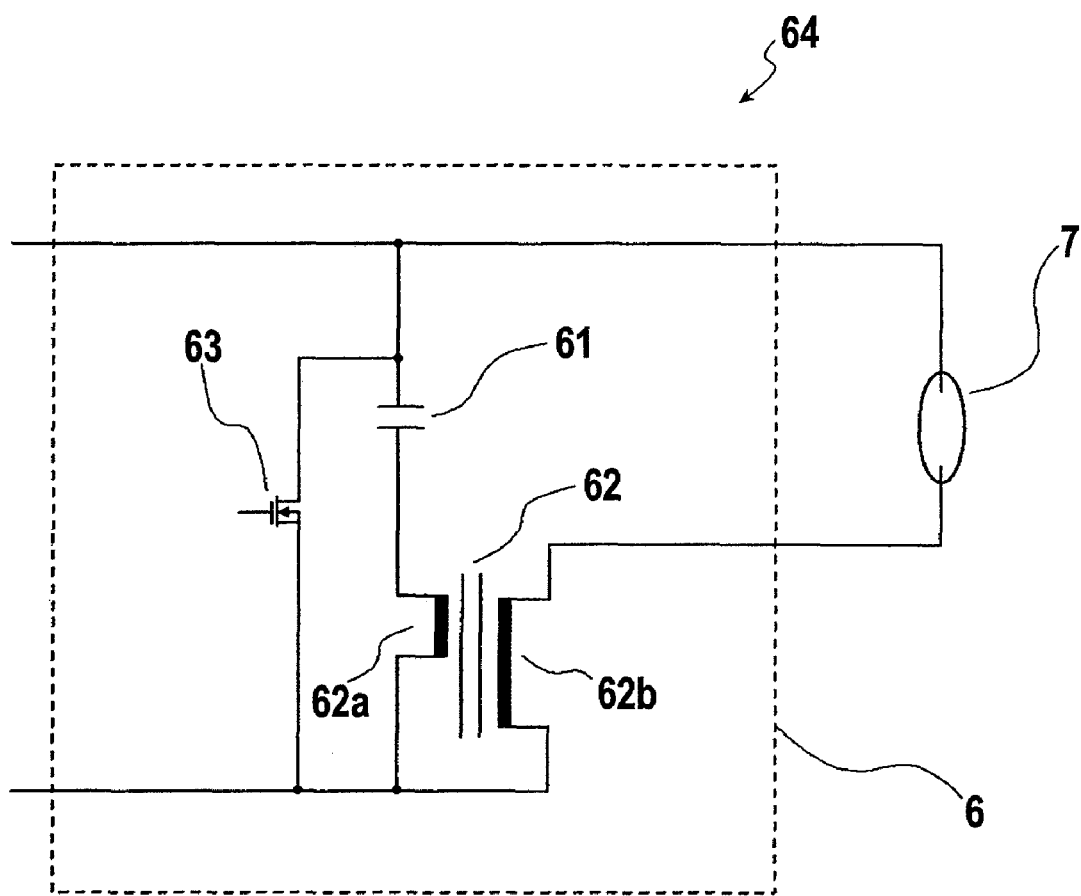
FIG. 2 is a circuit diagram of a conventional impulse starting circuit.

FIG. 2 shows an example (comparative example) of the starting circuit 6. This circuit is an impulse starting circuit 64 that uses a pulse transformer to increase a voltage applied to a primary side thereof several ten to hundred times and forwarding the increased voltage to a secondary side of the transformer, and that applies a high-voltage pulse having a relatively narrow width to the high-intensity discharge lamp 7. A series circuit of a capacitor 61 and a primary side 62a of a pulse transformer 62, a series circuit of a switching element 63, and a series circuit of the high-intensity discharge lamp 7 and a secondary side 62b of the pulse transformer 62, are connected to an output end of the DC/AC inverter 5 provided at a preceding stage. Voltage charged in the capacitor 61 is discharged all at once by the switching element 63 via the primary side 62a of the pulse transformer 62, at which time the voltage applied to the primary side 62a is raised up to several ten to hundred times and then forwarded to the secondary side 62b, so that a high-voltage pulse of several to tens of kV can be applied to the high-intensity discharge lamp 7.

Figure 3:
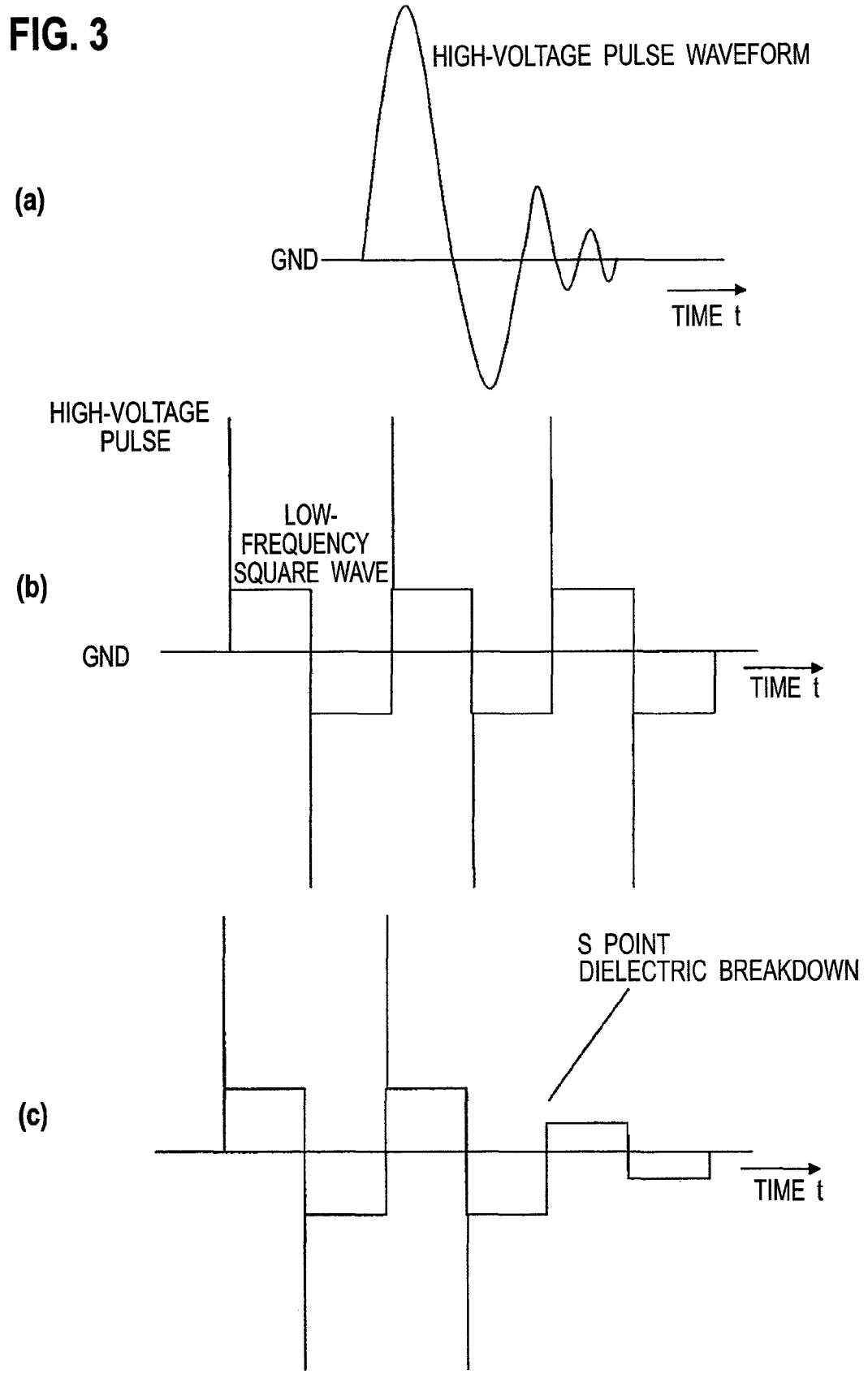
FIG. 3 shows operational waveforms of the starting circuit in FIG. 2.

In this case, a waveform of the high-voltage pulse is as shown in FIG. 3(a), and a relatively narrow pulse width, that is, relatively small pulse energy is obtained. In an actual case, this high-voltage pulse is superimposed upon a low-frequency square wave output at stable lighting time and fed to the high-intensity discharge lamp 7, as shown in FIG. 3(b). A point S in FIG. 3(c) indicates that the dielectric breakdown has occurred in the high-intensity discharge lamp 7 and it has started. Subsequent to the point S, the high-voltage pulse is terminated.

Figure 4:
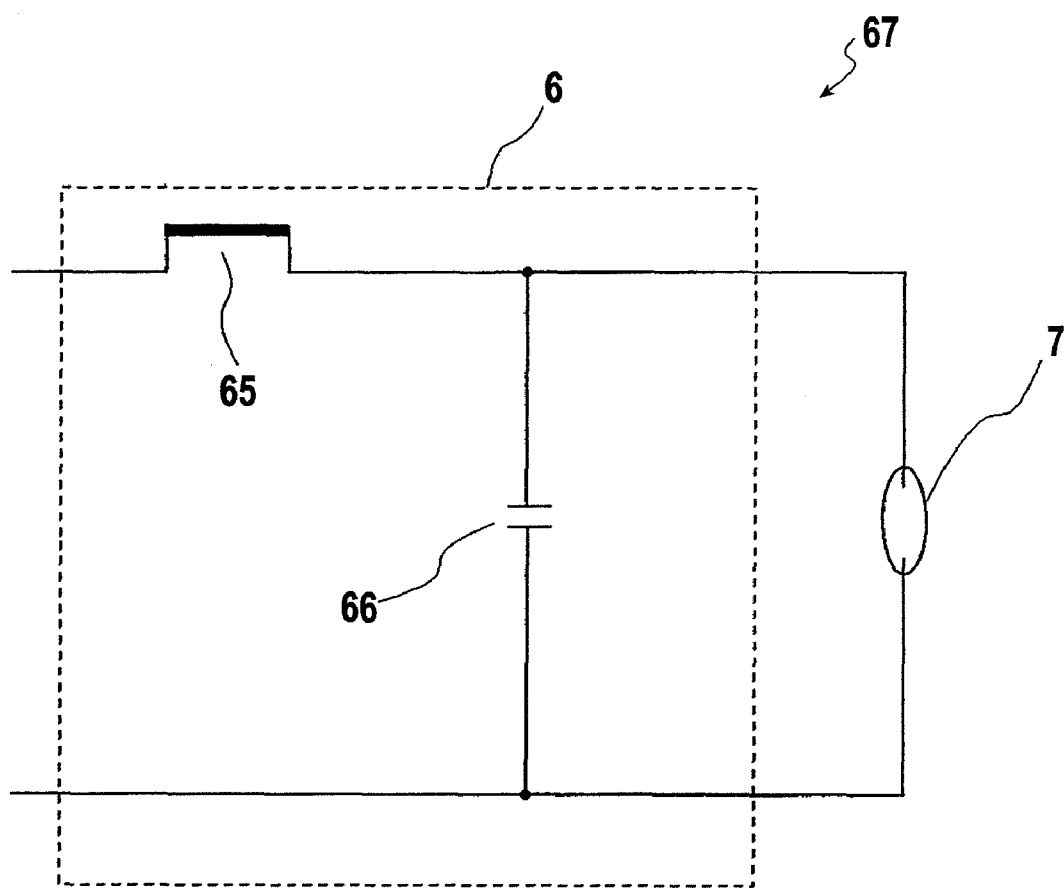
FIG. 4 is a circuit diagram of a resonant step-up starting circuit used in the present invention.

FIG. 4 shows another example (embodiment example) of the starting circuit 6. This circuit is a resonant step-up starting circuit 67 that is a resonance circuit composed of an inductor and a capacitor and generates a high-frequency voltage in the neighborhood of a resonance frequency of the resonance circuit by the DC/AC inverter 5 provided at the preceding stage, and that applies a high-voltage pulse having a relatively broad width to the high-intensity discharge lamp 7. A series circuit of an inductor 65 and a capacitor 66 is connected to the output end of the DC/AC inverter 5 of the preceding stage, and the capacitor 66 is connected in parallel with the high-intensity discharge lamp 7.

The DC/AC inverter 5 generates the high-frequency voltage in the neighborhood of the resonance frequency of the resonance circuit composed of the inductor 65 and the capacitor 66, which induces a resonant step-up voltage across the inductor 65 or the capacitor 66, thereby enabling an application of the high-voltage pulse of several to tens of kV to the high-intensity discharge lamp 7. In this case, a waveform of the high-voltage pulse is as shown in FIG. 5(a), and a few pulses are output together. A start-up condition of the high-intensity discharge lamp 7 is a relatively broad pulse width, that is, relatively large pulse energy. Note that, the inductor 65 can have a structure of a step-up transformer such as the foregoing pulse transformer 62 to apply a voltage several times as large as the primary side voltage.

The waveform of the high-voltage pulse in FIG. 5(a) corresponds to the case that an operational frequency of the DC/AC inverter 5 is fixed to a value in the neighborhood of the resonance frequency of the inductor 65 and the capacitor 66. In actual cases, the operational frequency of the DC/AC inverter 5 can be swept near the resonance frequency in order to absorb variations in the resonance frequency of the inductor 65 and the capacitor 66. At this time, a waveform of the high-voltage pulse is as shown in FIG. 5(b).

The high-voltage pulse is actually divided into a period of generating the high-voltage pulse by resonant step-up voltage and a period of outputting a low-frequency square wave at the stable lighting time, as shown in FIG. 6(a). Usually at a lighting determination time (point S in the drawing), a lighting state of the high-intensity discharge lamp 7 is determined, and when it is not lighted, subsequent outputs are terminated. This is because the energy of the high-voltage pulse is large as described earlier and it is therefore not preferable to output this large energy all the time in terms of safety and durability of components. Furthermore, from the property of the high-voltage-pulse generating period, it is set to a relatively long duration so that any types of the high-intensity discharge lamp 7 can be lighted up. When the high-intensity discharge lamp 7 causes the dielectric breakdown by the time of the point S in FIG. 6(b), then is started and lighted up, operation is continued until the lamp 7 lights stably as the low-frequency square wave output period. At this time, the high-voltage pulse is terminated in the same manner as in the previous example.

Recent studies have found that the impulse starting circuit 64 in FIG. 2 and the resonant step-up starting circuit 67 in FIG. 4 have their respective merits and demerits.

As described earlier, upon a dielectric breakdown of the high-intensity discharge lamp 7, the impulse starting circuit 4 sometimes cannot provide energy sufficient for the dielectric breakdown to the high-intensity discharge lamp 7 because the high-voltage pulse energy produced by the impulse starting circuit 4 is small. In contrast, the resonant step-up starting circuit 67 can ensure the dielectric breakdown of the high-intensity discharge lamp 7 because the high-voltage pulse energy produced by the resonant step-up starting circuit 67 is large.

Regarding another start-up condition, which is a transition to the arc discharge of the high-intensity discharge lamp 7, low-frequency power supply has been found to be effective in a smooth transition to the stable lighting of the high-intensity discharge lamp 7. The impulse starting circuit 64 ensures the smooth transition to the arc discharge because it supplies the low-frequency square wave to the high-intensity discharge lamp 7 all the time. In contrast, the resonant step-up starting circuit 67 cannot ensure the smooth transition to the arc discharge because it generates the high-voltage pulse by high-frequency operation and hence cannot supply the low-frequency square wave to the high-intensity discharge lamp 7 at least during the high-voltage pulse generating period.

This means that the impulse starting circuit 64 is disadvantageous in the dielectric breakdown and advantageous in the arc discharge transition, and the resonant step-up starting circuit 67 is advantageous in the dielectric breakdown and disadvantageous in the arc discharge transition, so that the both have good points and bad points.

Figure 7:
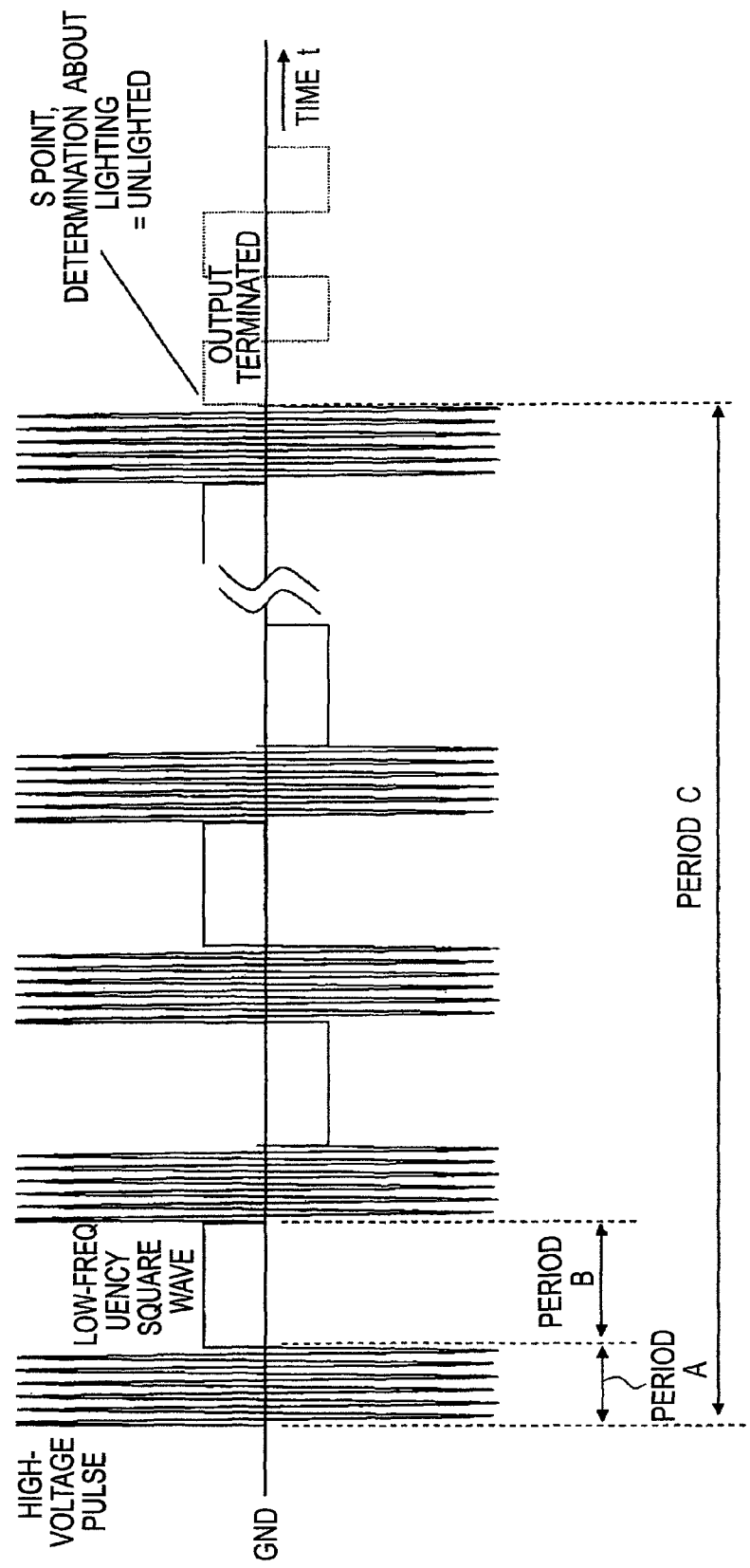
FIG. 7 shows an operational waveform in the first embodiment of the present invention.

Japanese Patent Application Laid-Open No. 2004-265707 has proposed an excellent starting method having the advantages of both the circuits. According to this document, as shown in FIG. 7, a period A of the resonant step-up starting circuit 67 and a period B of the low-frequency square wave are alternately repeated during a period C, so as thereby to combine the advantages of both the circuits in their starting operations. Specifically, the period A of the resonant step-up starting circuit 67 ensures the dielectric breakdown performance, and the period B of the low-frequency square wave ensures the arc discharge transition performance. The operational frequency of the DC/AC inverter 5 is a high frequency of 10 kHz or more (tens to hundreds of kHz) during the period A, and is a low frequency below 1 kHz (100 Hz to several hundreds of Hz) or a direct current during the period B.

Recent studies have found that it is important to set each of the periods A, B, and C described in Japanese Patent Application Laid-Open No. 2004-265707 to their respective optimum lengths of time, and also that, when the optimum lengths are not set, factors of the foregoing demerits of the impulse starting circuit 64 and the resonant step-up starting circuit 67 become seriously apparent. Specifically, when the period A of the resonant step-up starting circuit 67 is too short, the foregoing demerit of the impulse starting circuit 64 becomes apparent, resulting in the smooth transition to the arc discharge, but also in deficient dielectric breakdown performance. In contrast, when the period A of the resonant step-up starting circuit 67 is too long, the foregoing demerit of the resonant step-up starting circuit 67 becomes apparent, resulting in a satisfactory dielectric breakdown, but also in a non-smooth transition to the arc discharge.

Figure 8:
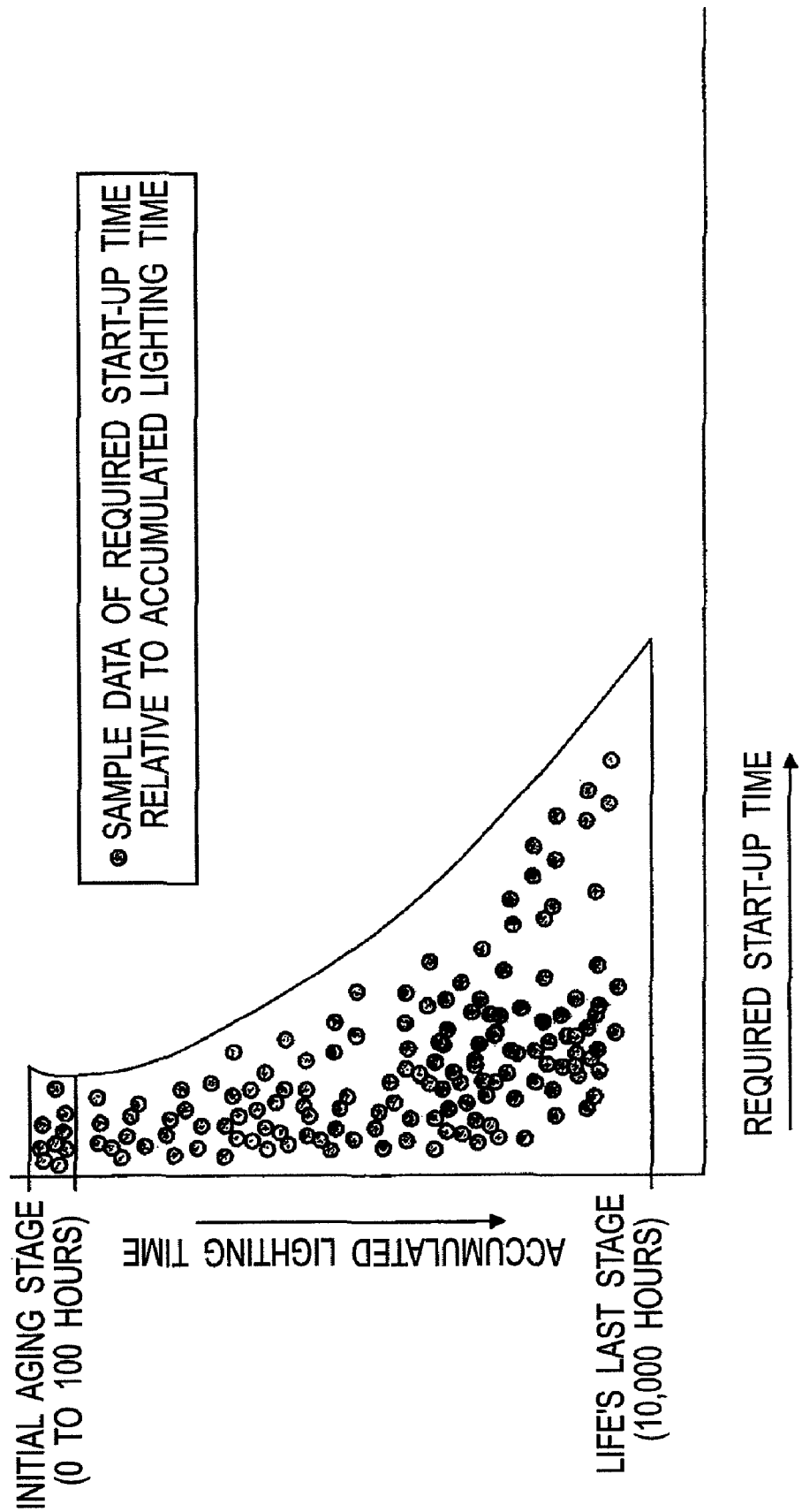
FIG. 8 is an explanatory diagram of the first embodiment of the present invention.

In addition, recent studies have found that the high-intensity discharge lamp 7 is relatively easy to start in an initial aging stage (e.g., 0 to 100 hours) right after product shipment, but as the end of service life (e.g., 10,000 hours) approaches, the high-intensity discharge lamp 7 becomes gradually difficult to start because of electrode sputtering and the like, as shown in FIG. 8.

More Specifically, when a time required for the dielectric breakdown of a discharge lamp in the initial aging stage is set as the period A, a discharge lamp in a life's last stage cannot obtain sufficient dielectric breakdown performance. In contrast, when a time required for the dielectric breakdown of the discharge lamp in the life's last stage is set as the period A, the discharge lamp in the initial aging stage cannot obtain sufficient arc discharge transition performance. In consideration of this inconsistency, it is very important that this lighting circuit provides satisfactory dielectric breakdown performance and arc discharge transition performance comprehensively to all high-intensity discharge lamps that can be handled in combination in real markets, and also ensures reliable starting performance.

Figure 9:
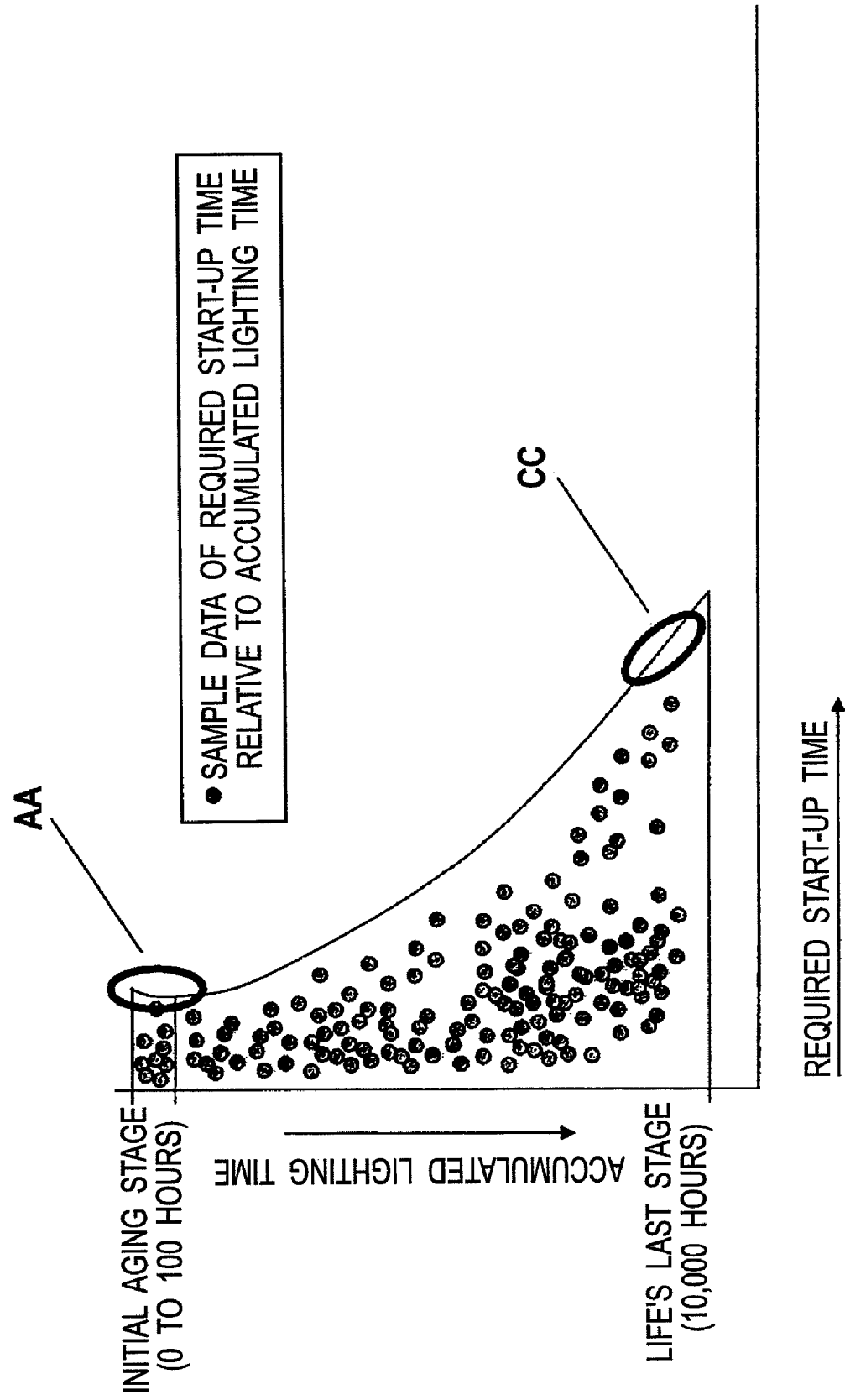
FIG. 9 is also an explanatory diagram of the first embodiment of the present invention.

Setting of the periods A and C according to the present invention will be described with reference to FIG. 9. As shown in FIG. 9, a dielectric-breakdown required time AA for a general high-intensity discharge lamp in the initial aging stage and a dielectric-breakdown required time CC for the high-intensity discharge lamp in the life's last stage are definite. Therefore, the period A for applying the high voltage by resonance operation in FIG. 7 is set approximately to the dielectric-breakdown required time AA for the general high-intensity discharge lamp in the initial aging stage, and also the period C for alternately outputting the high-voltage generating period and the low-frequency-square-wave voltage or DC voltage generating period is set approximately to the dielectric-breakdown required time CC for the high-intensity discharge lamp in the life's last stage. Note that "set approximately to" means, for example, that "the period A is the same length as the time AA, and the period C is the same length as or longer than the time CC", or that "the period A is the same length as or longer than the time AA, and the period C is the same length as or longer than the time CC".

The period B for outputting the low-frequency square wave or the DC output is set to a length of time corresponding to the low-frequency square wave at normal lighting time or longer than this length of time.

Setting of these periods is realized when a control circuit 8 of the DC/AC inverter 5 controls polarity inversion of the DC/AC inverter 5 in each period. In the period A, the DC/AC inverter 5 is operated at a high frequency (tens to hundreds of kHz) in the neighborhood of the resonance frequency of the starting circuit 6 thereby to output a resonant step-up high voltage, and in the period B, the DC/AC inverter 5 is operated at a low frequency (100 Hz to several hundreds of Hz) or by a direct current thereby to output a low-frequency square wave voltage or a DC voltage. The period C is composed of these alternately repeated periods A and B.

The control circuit 8 is usually composed of an 8-bit microcomputer and the like, and operational frequencies and durations of these periods A, B, and C can be set arbitrarily according to a microcomputer program.

Note that the DC/AC inverter 5 can be designed not only for operation at a fixed frequency near the resonance frequency but also for operation at a sweep frequency, as described earlier in the conventional example.

In this embodiment, the DC/DC converter 4 is made up of a step-down chopper circuit; however, as disclosed in Japanese Patent Application Laid-Open No. 2004-265707, the DC/DC converter 4 can be made up of a step-up chopper circuit or a flyback-type step-up/down converter circuit. Furthermore, the DC/DC converter 4 and the DC/AC inverter 5 are independent of each other; however, as disclosed in Japanese Patent Application Laid-Open No. 2004-265707, a full-bridge circuit or a half-bridge circuit having the both can be used. For example, upon an output of the low-frequency square wave voltage, a pair of switching elements on a low-potential side of the full-bridge circuit are turned ON and OFF alternately at a low frequency, and another switching element diagonally opposite to the ON-state switching element on a high-potential side is turned ON and OFF at a high frequency, so that the functions of both the DC/DC converter and the DC/AC inverter can be achieved by the single full-bridge circuit.

Second Embodiment

Figure 10:
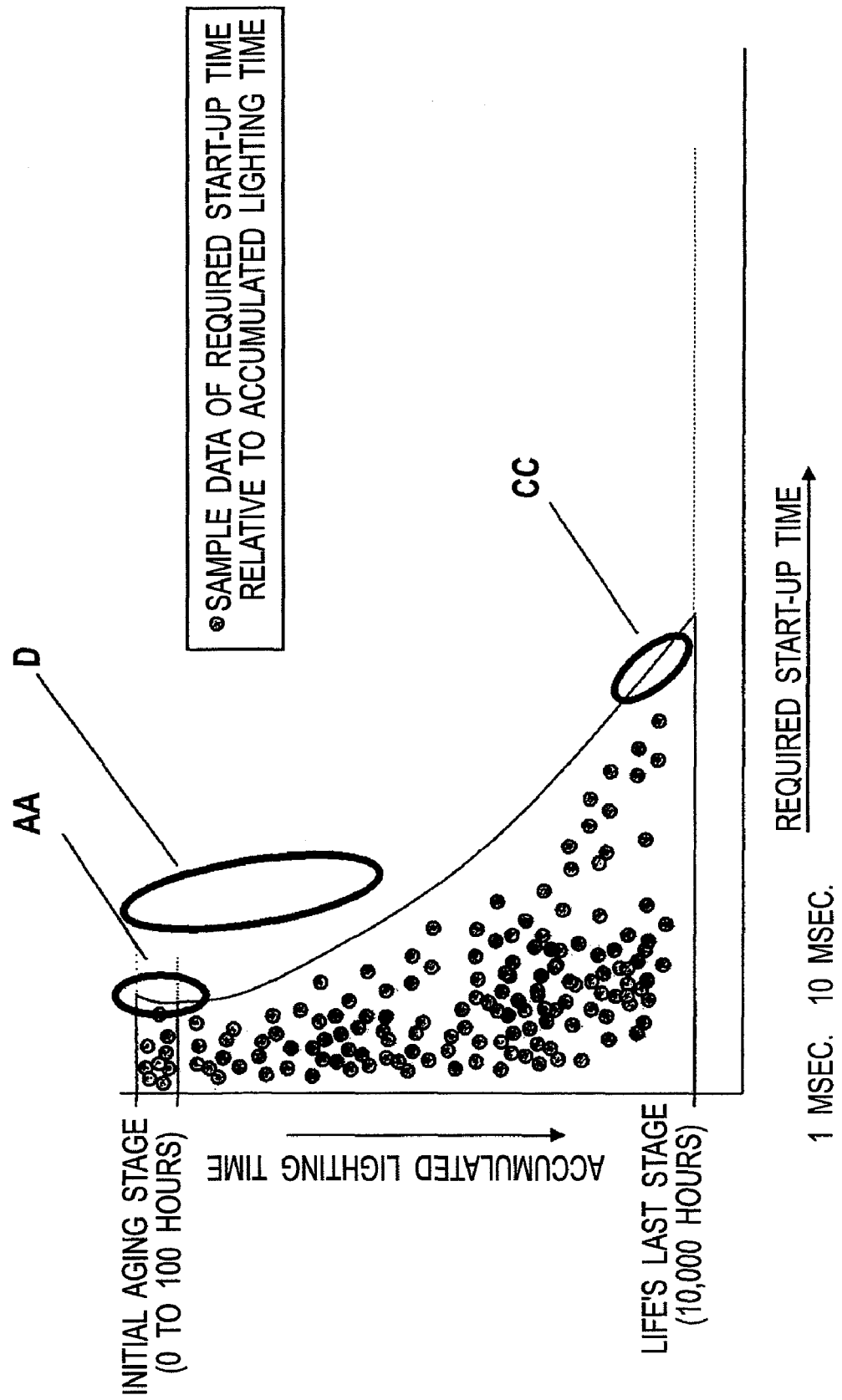
FIG. 10 is an explanatory diagram of a second embodiment of the present invention.

In addition to the explanation for the first embodiment, a second embodiment will be described with reference to FIG. 10. In the first embodiment, when the period A in FIG. 7 is set to a value that is too long in duration, the aforementioned demerit of non-smooth transition to the arc discharge that is observed in the starting circuit 67 becomes apparent, and therefore the value of the period A needs to be considered very carefully. When a time at which the transition to the arc discharge is getting non-smooth is represented by a time D, the period A needs to satisfy the condition in the first embodiment and also needs to be shorter than the time D at which the transition to the arc discharge is getting non-smooth. In this embodiment, the high-frequency operating period A in FIG. 7 is set to a length of time not less than the dielectric-breakdown required time AA for the general high-intensity discharge lamp in the initial aging stage, and not more than the time D at which the transition to the arc discharge is getting non-smooth. The period B is set to a length of time corresponding to the low-frequency square wave during normal lighting time or shorter. Setting of these periods is controlled by the microcomputer of the control circuit 8 as in the same manner as the first embodiment.

Third Embodiment

Figure 11:
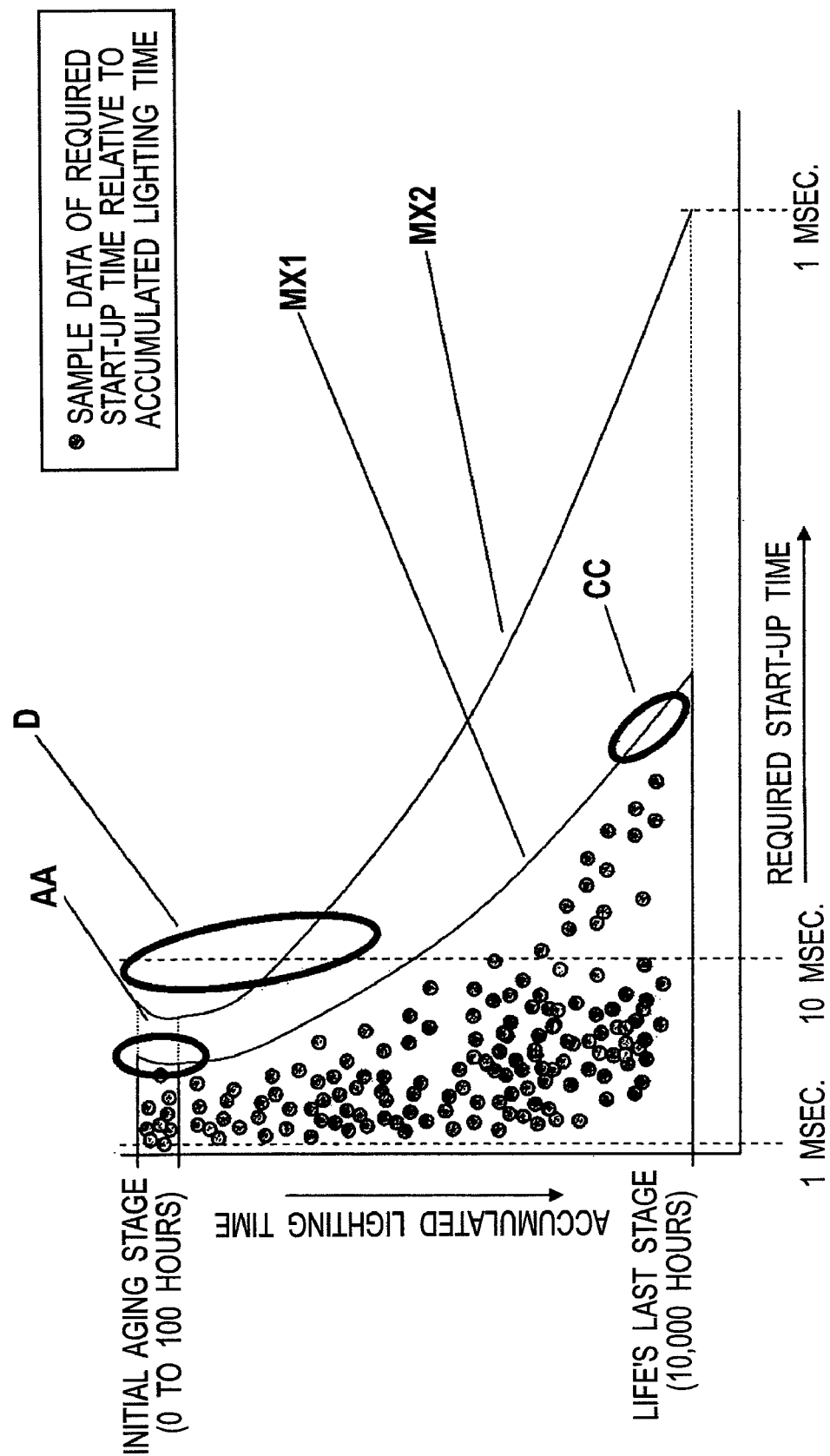
FIG. 11 is an explanatory diagram of a third embodiment of the present invention.

In addition to the explanation for the first embodiment, a third embodiment will be described with reference to FIG. 11. FIG. 8 explained above shows sampling data of discharge lamps that have already been manufactured on a commercial basis at the present time. In consideration of the present situation where novel discharge lamps with compact size, high efficiency, and the like are released one after another to the market, it is necessary to fully consider that the time required for the dielectric breakdown of these lamps becomes long after they are designed. Specifically, as shown in FIG. 11, in consideration of a risk of distribution of high-intensity discharge lamps having more difficulty in the dielectric breakdown than samples of high-intensity discharge lamps that can be tested at the design time (a sample-data maximum value MX1 of discharge lamps already commercially manufactured, a sample-data estimated maximum value MX2 of new discharge lamps expected to be commercially manufactured), the time required for the dielectric breakdown needs to be set a little longer.

When the period A in FIG. 7 is set to a value that is too long in duration, the aforementioned demerit of non-smooth transition to the arc discharge observed in the starting circuit 67 becomes apparent, and therefore the value of the period A needs to be considered carefully. As a result of investigation, the transition to the arc discharge of the discharge lamp is not performed smoothly when the period A is 10 msec. or longer.

An estimated time of the period C in FIG. 7 greatly varies because the period C is the time until which the discharge lamp in the life's last stage causes the dielectric breakdown. In general, generation of a high-voltage waveform as seen in the period C involving the period A for 1 sec. or longer is not preferable in terms of reliability of electronic components used in this lighting circuit and safety of users.

Accordingly, the period A in FIG. 7 is set to 1 to 10 msec., and the period C in FIG. 7 is set to 10 msec. to 1 sec. The period B is set to a length of time corresponding to the low-frequency square wave during normal lighting time or longer. Setting of these periods is controlled by the microcomputer of the control circuit 8 in the same manner as the first embodiment.

Fourth Embodiment

Figure 12:
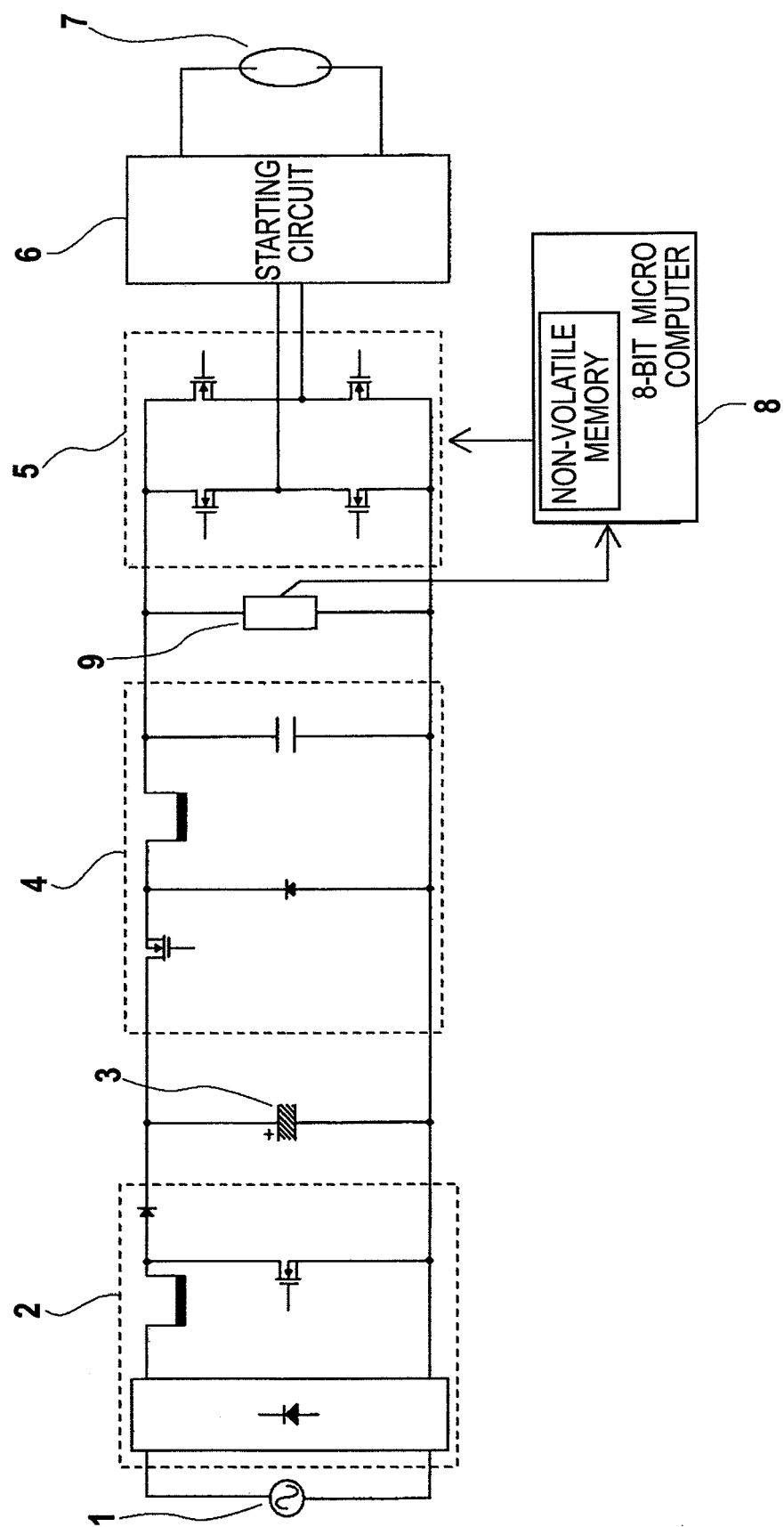
FIG. 12 is a circuit diagram according to a fourth embodiment of the present invention.

A fourth embodiment will be described with reference to FIG. 12. Referring to FIG. 12, a discharge-lamp tube voltage detector circuit 9 is additionally provided as means for determining accumulated lighting time of the high-intensity discharge lamp 7, so that the accumulated lighting time can be determined to be getting long when a tube voltage rises. This utilizes a property of the discharge lamp that the tube voltage thereof rises as the end of service life approaches. The tube voltage detected by the tube voltage detector circuit 9 is informed to the control circuit 8, and this information is stored in a non-volatile memory, so that the period C can be set longer as the end of service life approaches, that is, as the accumulated lighting time becomes long.

In addition, a non-volatile timer function (by which timer count value is stored even when power is turned OFF) can be provided to the control circuit 8 to determine the accumulated lighting time of the discharge lamp, by counting the lighting time of the discharge lamp with this timer and resetting the timer at lamp replacement time.

Fifth Embodiment

The discharge-lamp lighting devices according to the first to the fourth embodiments can be built in a luminaire to which a high-intensity discharge lamp is attached, or can be used as a stabilizer externally provided to a lamp fitting. Furthermore, such luminaire can be combined with a human sensor or a brightness sensor to provide an illumination system that controls light output depending on sensor output. Moreover, such luminaire can be combined with a timer to provide an illumination system that controls light output depending on time zones. Furthermore, such luminaire can be used for a projection-type image display device and a headlight of a vehicle that use a high-intensity discharge lamp as a light source, and in this case, the light output quickly rises advantageously because of smooth starting of the discharge lamp.

INDUSTRIAL APPLICABILITY

According to the present invention, there is provided a discharge-lamp lighting device that offers optimum dielectric breakdown performance and arc discharge performance of a high-intensity discharge lamp and realizes smooth starting thereof in a starting process, by associating a period for applying a high voltage by resonance operation, a period for applying a low-frequency-square-wave voltage or a DC voltage, and a cycle of these repetitive periods, with a time required for a dielectric breakdown of a discharge lamp both in an initial aging stage and in a life's last stage.

The invention claimed is:

1. A discharge-lamp lighting device, comprising:
a DC/DC converter that converts a power supply voltage of a DC power supply and stably lights a high-intensity discharge lamp;
a DC/AC inverter that converts the DC voltage into an AC voltage; and
a starting circuit that has a resonance circuit composed of at least one or more capacitors and inductors, and supplies an output from the DC/AC inverter to the high-intensity discharge lamp, wherein
upon start-up of the high-intensity discharge lamp, a period during which the starting circuit applies a high voltage generated by resonance operation of the resonance circuit to the high-intensity discharge lamp when the DC/AC inverter outputs a high-frequency voltage, and a period during which the DC/AC inverter applies a low-frequency-square-wave voltage or a DC voltage to the high-intensity discharge lamp via the starting circuit, are output in an alternate manner, while the high-intensity discharge lamp is lighted, the DC/AC inverter applies the low-frequency -square-wave voltage to the high-intensity discharge lamp via the starting circuit, and the period for applying the high-voltage by the resonance operation is set to about a time enough for a high-intensity discharge lamp in an initial stage of a service life thereof to cause a dielectric breakdown, and a period for outputting the high-voltage generating period and the low-frequency-square-wave voltage or DC voltage generating period in the alternate manner is set to about a time enough for a high-intensity discharge lamp in a last stage of the service life thereof to cause the dielectric breakdown.

2. The discharge-lamp lighting device according to claim 1,
wherein the period for applying the high voltage by the resonance operation is set to a length of time not less than the time enough for the high-intensity discharge lamp in the initial stage of the service life thereof to cause the dielectric breakdown, and not more than a time until which a transition to arc discharge is not hindered by high-frequency lighting.

3. The discharge-lamp lighting device according to claim 1,
wherein the time enough for the high-intensity discharge lamp in the initial stage of the service life thereof to cause the dielectric breakdown is 1 msec. or longer and 10 msec. or shorter, and the time enough for the high-intensity discharge lamp in the last stage of the service life thereof to cause the dielectric breakdown is 10 msec. or longer and 1 sec. or shorter.

4. The discharge-lamp lighting device according to claim 1, further comprising:
a unit that determines accumulated lighting time of the high-intensity discharge lamp, wherein
as the accumulated lighting time increases, the period for outputting the high-voltage generating period and the low-frequency-square-wave voltage or DC voltage generating period in the alternate manner is extended.

5. A luminaire having the discharge-lamp lighting device according to claim 1.

6. The discharge-lamp lighting device according to claim 2, wherein the time enough for the high-intensity discharge lamp in the initial stage of the service life thereof to cause the dielectric breakdown is 1 msec. or longer and 10 msec. or shorter, and the time enough for the high-intensity discharge lamp in the last stage of the service life thereof to cause the dielectric breakdown is 10 msec. or longer and 1 sec. or shorter.

7. The discharge-lamp lighting device according to claim 2, further comprising:
a unit that determines accumulated lighting time of the high-intensity discharge lamp, wherein
as the accumulated lighting time increases, the period for outputting the high-voltage generating period and the low-frequency-square-wave voltage or DC voltage generating period in the alternate manner is extended.

8. The discharge-lamp lighting device according to claim 3, further comprising:
a unit that determines accumulated lighting time of the high-intensity discharge lamp, wherein
as the accumulated lighting time increases, the period for outputting the high-voltage generating period and the low-frequency-square-wave voltage or DC voltage generating period in the alternate manner is extended.

9. The discharge-lamp lighting device according to claim 6, further comprising:
a unit that determines accumulated lighting time of the high-intensity discharge lamp, wherein
as the accumulated lighting time increases, the period for outputting the high-voltage generating period and the low-frequency-square-wave voltage or DC voltage generating period in the alternate manner is extended.

10. A luminaire having the discharge-lamp lighting device according to claim 2.

11. A luminaire having the discharge-lamp lighting device according to claim 3.

12. A luminaire having the discharge-lamp lighting device according to claim 4.

13. A luminaire having the discharge-lamp lighting device according to claim 6.

14. A luminaire having the discharge-lamp lighting device according to claim 7.

15. A luminaire having the discharge-lamp lighting device according to claim 8.

16. A luminaire having the discharge-lamp lighting device according to claim 9.

* * * * *